United States Patent
Gerl et al.

(10) Patent No.: US 7,312,460 B2
(45) Date of Patent: Dec. 25, 2007

(54) HIGH ENERGY GAMMA PROBE WITH POSITION SENSING CAPABILITY

(75) Inventors: Jurgen Gerl, Dietzenbach (DE); Ivan Kojouharov, Zornheim (DE); Frederic Ameil, Egelsbach (DE); Alicija Surowiec, Dreieich (DE)

(73) Assignee: GFE Gesselschaft fur Forschungsund Entwicklungsservice mbH, Dietzenbach (DE)

( * ) Notice: Subject to any disclaimer, the term of this patent is extended or adjusted under 35 U.S.C. 154(b) by 254 days.

(21) Appl. No.: 11/125,190

(22) Filed: May 10, 2005

(65) Prior Publication Data

US 2005/0263711 A1    Dec. 1, 2005

(30) Foreign Application Priority Data

May 10, 2004   (EP)   .................. 04011020

(51) Int. Cl.
*G01T 1/00*    (2006.01)
(52) U.S. Cl. ...................... 250/393
(58) Field of Classification Search ............ 250/393
See application file for complete search history.

(56) References Cited

U.S. PATENT DOCUMENTS

| | | |
|---|---|---|
| 3,982,128 A | 9/1976 | Groch et al. |
| 4,172,226 A | 10/1979 | Rubin |
| 4,959,547 A | 9/1990 | Carroll et al. |
| 5,036,201 A | 7/1991 | Carroll et al. |
| 5,148,040 A | 9/1992 | Wise, Jr. et al. |
| 5,345,084 A | 9/1994 | Byrd |
| 5,694,933 A * | 12/1997 | Madden et al. ............. 600/431 |
| 5,813,985 A * | 9/1998 | Carroll ...................... 600/436 |
| 7,038,205 B2 * | 5/2006 | Bushberg et al. ........ 250/336.1 |

FOREIGN PATENT DOCUMENTS

| | | |
|---|---|---|
| EP | 0 768 544 A2 | 4/1997 |
| WO | WO-02/44755 A2 | 6/2002 |

OTHER PUBLICATIONS

H. Wengenmair et al., Der Nuklearmediziner Nr. 4, 22 (1999), 271.

* cited by examiner

*Primary Examiner*—David Porta
*Assistant Examiner*—Christopher G Webb
(74) *Attorney, Agent, or Firm*—Birch, Stewart, Kolasch & Birch, LLP

(57) ABSTRACT

The present invention relates to a method of detecting and localizing gamma radiation from a target source in the possible presence of background gamma radiation, said method comprising the steps of:
a) detecting the directional intensity distribution of gamma rays with respect to a preferred direction,
b) analysing the direction dependence, correcting for efficiency and solid angle of the detection means,
c) determining the amount and spatial distribution of background radiation,
d) determining the background contribution of the intensity measured in the preferred direction from the amount and spatial distribution of background radiation,
e) determining the strength of gamma radiation in a preferred direction by subtracting from the intensity measured in the preferred direction any background contribution from non preferred directions.

20 Claims, 2 Drawing Sheets

HIGH ENERGY GAMMA PROBE WITH POSITION SENSING CAPABILITY

FIELD OF THE INVENTION

The present invention relates to apparatus and method for detecting and localizing gamma radiation for medical and technical applications suitable for 511 keV positron annihilation radiation and even larger gamma ray energies exceeding 1 MeV.

BACKGROUND

The labelling of tissue with radioactive substances is a well established method in medical diagnosis and surgery. Employing radiation detecting devices the specific uptake of radioactivity, e.g. in malignant tissue, is detected and localized. Various types of gamma cameras provide scintigraphic images of the radiation distribution within a patient for diagnostic purposes. However, they are too bulky and too slow for radio guided surgery. Hand-held gamma probes with a head consisting of a radiation detector, shielding and a collimator are widely used for that purpose (e.g. WO 02/44755 A2). Such a probe is moved by the surgeon across a suspected region of the patient to locate e.g. cancerous tissue manifested by excess radiation as compared to the surrounding.

The activity injected into a patient should be kept as low as possible for the sake of the patient and the medical staff. This requires the detection efficiency of the gamma probe to be as large as possible. Assuming a point-like gamma source, the detection efficiency is predominantly determined by the solid angle covered by the gamma detector and by the detection efficiency. Large volume detectors cannot be used since the probe head needs to be light-weight and compact to allow for accurate manoeuvring and precise pointing at tumour manifestations. Therefore dense scintillators or solid state diodes composed of heavy elements are mandatory. More important, the distance of the detector to the target needs to be minimized. Assuming a typical distance of malignant tissue to the body surface of 10 mm, the detection efficiency of a probe placed directly at the body surface is four times respectively nine times larger than the efficiency achievable at 10 mm and 20 mm apart from the surface. Collimation of the field of view as discussed below often requires retracted position of the detector. These conditions lead to a generally accepted minimal efficiency corresponding to a sensitivity of about 5 cps/kBq and thus to a minimal required activity of a few kBq for a target to be detectable.

Unfortunately, gamma rays from the labelled site tend to scatter off the surrounding tissue and organs, thereby contributing to a diffuse radiation background rendering the localization of the original source difficult. In addition commonly employed radio pharmaceuticals enrich non-selectively in organs like liver or brain and are present throughout the whole body to some extent. Therefore intense background radioactivity is prevalent near tumour sites. One possibility to distinguish a scattered gamma ray from a direct gamma ray emitted by a source is by its energy. Only gamma rays coming in direct line from the source into the detector possess their full energy, whereas in any scattering process some energy is lost. Employing an energy sensitive detector and selecting events with the full gamma ray energy therefore allows to suppress background of scattered gamma rays. This method is only applicable with radio isotopes which emit gamma rays of one energy like $^{99m}$Tc, while isotopes with several gamma transitions (e.g. $^{111}$In: 171 keV, 245 keV) are excluded. Moreover, not all gamma rays are fully absorbed in the detector. Depending on the type and size of scintillator or solid state diode used as detector, and on the energy of the gamma ray, the majority of gamma rays may deposit only part of their energy and will thus be assigned to background. Consequently the remaining rate of accepted direct gamma rays from a source may be severely lowered, reducing the sensitivity to detect and locate malignant tissue unless the statistical accuracy is re-established by an increased activity applied to the patient.

Another approach to suppress not only the background of scattered gamma rays but also the background radiation from other sources nearby the suspected tumour site is to utilize shielding and collimating material with the detector. Shield and collimator are made from dense, heavy metals like lead or tungsten alloys, yielding highest gamma ray absorption. The collimator is meant to define the field of view of the detector. For proper location particularly of small tumours high spatial selectivity is demanded, which requires a narrow opening cone of the collimator (compare H. Wengenmair et al.; Der Nuklearmediziner Nr. 4, 22 (1999) 271). The narrower the cone the smaller is the body volume contributing to the background signal, while the target signal from a tumour stays constant. At a distance of 30 cm (far field) the full width at half maximum (FWHM) of the radial signal rate distribution, determined by the cone and detector geometry, should be $\leq 40°$ for universal gamma probes. For cases with close-by background sources or unfavourable target to background ratio a narrower distribution is preferable. In typical applications the distance of the radiation sensitive part of the probe to the tissue to be inspected is about 10 mm. To distinguish close lying point-like sources, e.g. neighbouring lymph nodes, the spatial resolution of the probe at close distance (near field) to the target needs at least to be <25 mm. For the localization of very small lymph nodes for example prevalent in head and neck regions a near field precision of <15 mm FWHM is necessary. On the other hand a too narrow collimation is counter productive if large body regions need to be scanned during surgery. In that case a wider cone is preferable to shorten the screening time. Exchangeable and adjustable collimators (see e.g. U.S. Pat. No. 5,036,201, U.S. Pat. No. 4,959,547) are used with available gamma probes to adopt the cone characteristics to the application.

Background radiation may hit the probe from almost any direction. Therefore collimation and shielding needs to protect the detector from all sides but the opening cone. It was even suggested to use large shields external to the gamma probe (U.S. Pat. No. 5,148,040). In the worst case the injection depot of a radio pharmaceutical may be located in the vicinity of the probe with an activity 1000 times above the activity of cancerous tissue. Shield thickness of <4 mm is sufficient to provide an optimal absorption factor of >$10^3$ for background radiation of 140 keV energy emitted by $^{99m}$Tc. Already for 364 keV gamma rays of the radio isotope $^{131}$I the attenuation of strongest absorbers, like tungsten, is no longer sufficient to reach this background suppression factor. To keep the weight of the probe well below 1 kg and the head diameter below 25 mm a maximal shield thickness of 9 mm is applicable, yielding a suppression factor of about 20. Increasing the shield thickness to 18 mm tungsten or 25 mm lead would reestablish the wanted background reduction. However, in that case the probe head would become too heavy and too bulky to be suitable.

For many medical applications PET radio pharmaceuticals like $^{18}$F-FDG turn out to be superior over conventional low energy tracers because of much higher specific concentration in malignant tissue, potentially leading to higher sensitivity and selectivity. However, for the 511 keV gamma rays of $^{18}$F-FDG the suppression factor of 9 mm thick tungsten is only 10 which severely limits the use of state-of-the-art probes for many applications.

As such, there is a need for a gamma probe, which may be employed in detecting and localizing gamma rays of 511 keV and even higher energies, which avoids the above mentioned restriction of contemporary art probes.

BRIEF STATEMENT OF INVENTION

The present invention describes a new gamma ray detection and localization method and apparatus, unique from the previous methods mentioned above. Contrary to prior art the present invention does not rely on heavy metal collimating and shielding thereby avoiding the gamma energy limitations inherent to conventional gamma probes.

This is possible by employing a multitude of gamma detectors as radiation detection means. The geometrical arrangement is such that each detector has a field of view at least partially different from each other detector. Moreover, each detector acts at least partially as shield for at least one other detector. In a preferred embodiment of the method said detectors are geometrically arranged in a way that they subtend with their combined fields of view all directions from which gamma radiation is expected. If one point-like target source 1 of radiation is present, as shown schematically in FIG. 1, detector 11 directly viewing the source exhibit higher counting rate compared to those detectors 12 shadowed from direct view and positioned further away. The size of the detectors must assure that for all gamma energies to be accepted the absorption probability in the direct view detectors is at least 30% to achieve considerable reduction of the count rate in the shadowed detectors. The count rate values of the detectors form a characteristic pattern which allows to determine the direction from which the irradiation of the detectors occurs. A neighbouring concentrated source 2 in superposition to the target source 1 is reflected by the pattern as well as a diffuse, extended background source 3. Analysis of the pattern reveals the location of radiation concentrations. From that, both the net gamma intensity in the preferred target direction and the direction of highest gamma intensity can be determined.

A gamma probe of the present invention comprises a) a multitude of gamma detectors in a close-packed geometrical arrangement; b) signal processing means for each detector, c) data processing means to generate from the detector signals count rate information; d); computing means to perform count rate analysis for all detectors; e) interfacing means to generate visual or acoustic information.

These, as well as other advantages of the present invention will be evident and more clearly understood from the following description and drawings. It is understood that changes in the specific structure shown and described may be made within the scope of the claims without departing from the spirit of the invention.

DESCRIPTION OF THE INVENTION

For a universal gamma probe all kinds of spatial distribution of background radiation has to be considered: a) diffuse, broadly distributed background, e.g. from non-specific activation of a body and multiple gamma scattering processes, b) radiation limited to a specific volume, for example to organs like kidney or liver and c) well localized point-like radiation sources as with malignant lymph nodes. All these sources may occur concurrently. Therefore a certain multitude of background measuring detectors is required to be able to identify and quantify the background contribution to the count rate of the gamma detector directly viewing a supposed target source. Previously a dual gamma probe has been published using a central detector surrounded by an annular outer detector to distinguish the activity in the left heart ventricle from pulmonary crosstalk from the right heart in cardiac evaluation (ZA 7601612). However, the presented geometrical arrangement would not allow for a quantitative determination of background.

For any given target detector arrangement the disturbing background rate depends specifically on the direction from where the background radiation originates. Assuming that background radiation may occur from any direction a preferred geometrical set-up consists of one target gamma detector 11 and three background gamma detectors 12 in a tetrahedral configuration as shown schematically in FIG. 2a. The target detector 11 is aligned to the principal axis of the preferred target orientation 13. Each detector covers a distinct field of view and is partially or completely shadowed in all other directions. The shadowing results in a reduction of the detection rate due to the absorption of gamma rays by the shadowing detector. The higher the absorption factor, the smaller is the background contribution from the shadowed direction. Therefore the size of the detectors should be as large as possible. On the other hand for a hand-held probe size and weight considerations limit the linear dimensions of each detector to about 10 mm. Considering 511 keV gamma rays and often used CsI scintillators for the detectors the absorption factor thus is about 2 at maximum. Therefore strong background sources can not be effectively shielded even if they are completely shadowed by background detectors. Moreover, extended background sources are likely to be viewed directly to a certain fraction by the target detector.

Figure 1:
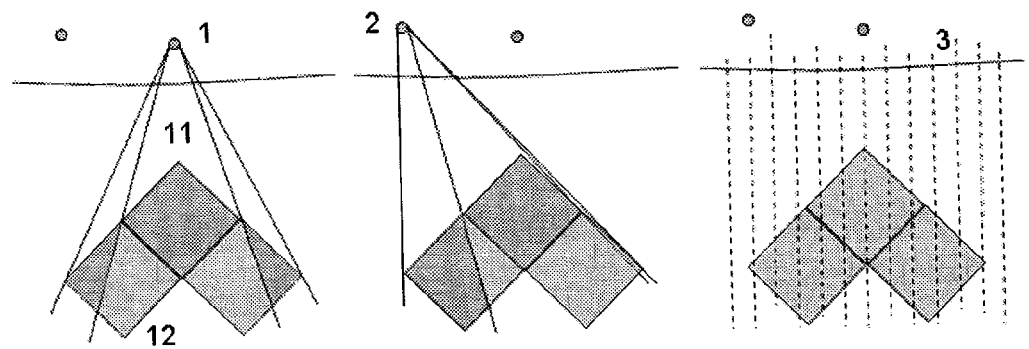
FIG. 1 shows a schematic drawing of the measurement principle.
Figure 2:
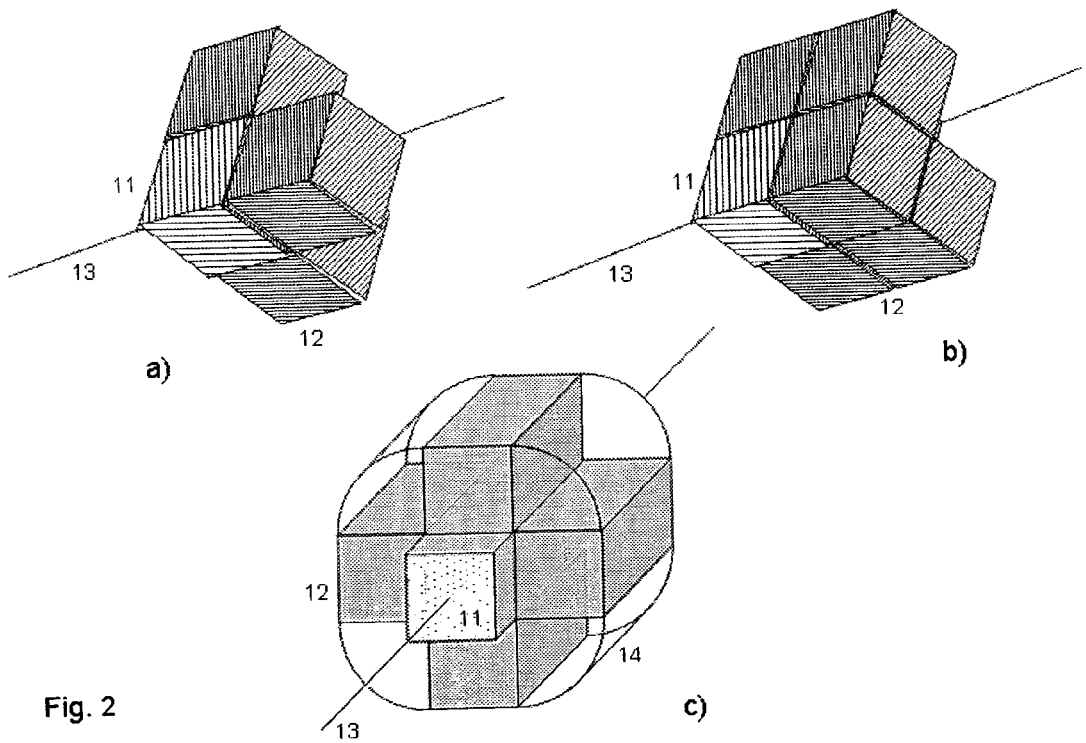
FIG. 2 shows examples for suitable detector arrangements.

The situation is improved in the preferred geometry of FIG. 2b with one target detector 11 and six background detectors 12. Here the solid angles of direct view are reduced yielding an improved background source location and, particularly for the target detector reduced background contribution. Increasing the number of detectors further generally results in improved direction definition and improved ability to identify multitudes of individual background sources. Improved direction definition may also be achieved by passive dense metal absorbers 14 to shield space between detectors as indicated in FIG. 2c. Those skilled in the art may easily find geometrical arrangements for the detectors with the help of computer modelling and Monte Carlo simulations, suitable to a particular application of the gamma probe.

In a preferred embodiment of the invention five CsI(Tl) scintillating crystals of the shape and configuration shown in FIG. 2c are used for gamma detectors. Each crystal uses for light read-out a Si PIN-diode. Other types of scintillating crystals like NaI(Tl) or LSO may be used as well. Suitable alternatives for the light read-out are other types of diodes or photomultiplier tubes. Solid state detectors like CdTl or CZT are well suited too, especially if larger size segmented detectors are employed. Compact packing of the detectors with as little empty space in-between as possible is essential, taking care to avoid optical or electrical cross-talk between the detectors.

Figure 3:
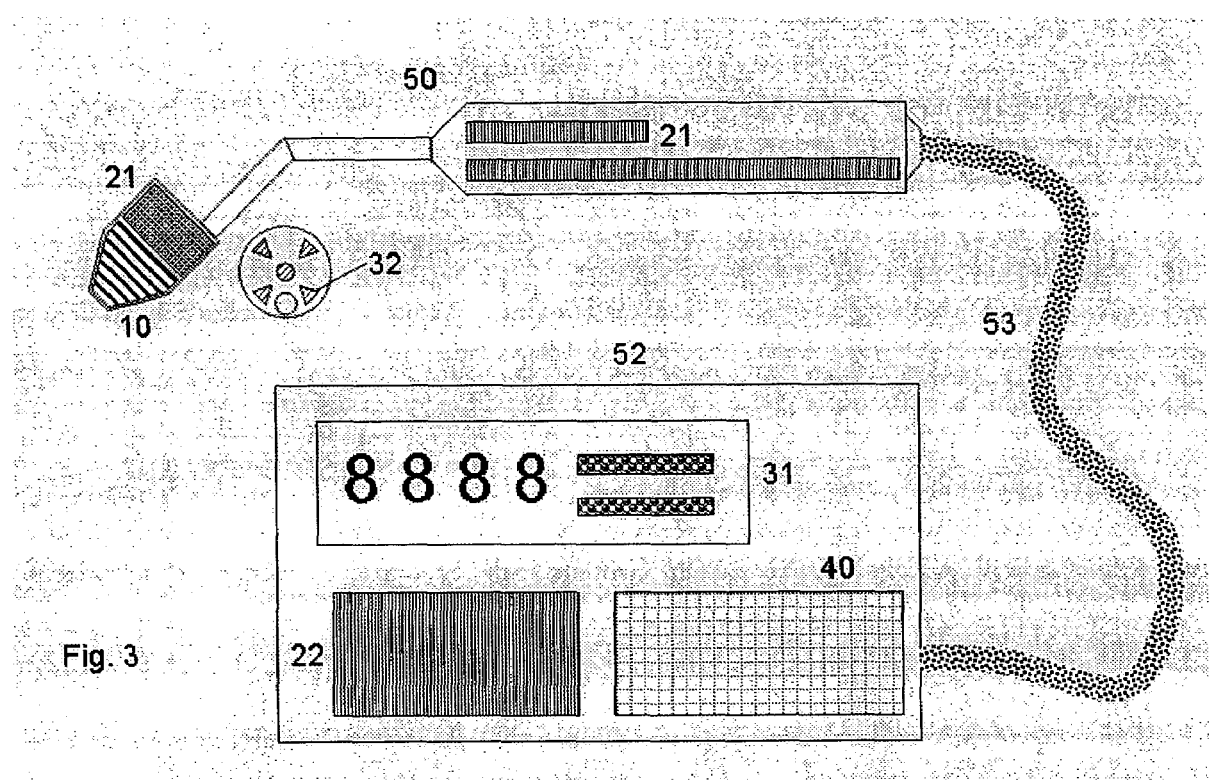
FIG. 3 shows schematically a preferred embodiment of the apparatus of the present invention.

FIG. 3 shows schematically a preferred embodiment of the apparatus of the invention. It consists of the hand-held probe 50 in a metal housing with the detector arrangement 10 and processing electronics 21 included. The electrical pulses produced by the detectors need to be processed in the well established way, using electronic pulse shaping and amplification before logic signals are generated by pulse discriminators. The probe is connected to a control unit 52 via a cable 53 for power and signal transmission. The control unit comprises the digital electronics 22, a display 31 and batteries 40 for electrical power supply, Resetable electronic counters are used to count the rate of each detector. The count rates are read by a microcontroller which computes the spatial radiation distribution and the background contribution to the count rate of the target detector. In the discussed embodiment the net count rate of the target detector after background subtraction is displayed numerically on a numeric display 31. Other commonly used interfacing possibilities include LED bar graphs and frequency modulated acoustical signals emitted by a loudspeaker.

An advantage of the invention is the possibility to indicate the direction of highest gamma intensity. Those operating gamma probes will appreciate the guidance in finding local radiation maxima when manoeuvring the device across a body. A possible way to show the direction, chosen for the discussed embodiment of the invention, is by four LEDs 32 representing left, right, up, down, of which the one corresponding to the highest observed gamma intensity is activated.

The count rates analysis is simplified by the constraint that a certain direction is defined with respect to the detector arrangement as the pointing direction 13 of the gamma probe. A preferred pointing direction is along the symmetry axis of the detector head. Like with conventional gamma probes the operator is supposed to move the probe on the body surface unless this pointing position coincides with the location of the target source. The count rate of the one or several front detectors directly viewing the pointing direction is sensitive to the target source. If such target source is present in the pointing directions, said front detector rates are higher than the rates in partially or completely hidden side and back detectors.

A preferred simple analysis procedure to derive the relative gamma activity in the pointing direction comprises the following steps: First the rate of each detector is calibrated to account for different detection efficiency and solid angle of view of a radiation source for a given gamma energy. The calibrated detector rates are normalized to the rate of the target detector, defined as the detector mainly viewing the preferred direction. The statistical uncertainty of the measured count rates of each detector is calculated. Employing for example a well known least squares fitting procedure, the normalized detector rates are compared to a data base of predetermined normalized detector rates associated to different radiation background scenarios to derive at the best fitting scenario. Thereby the statistical uncertainties of the detector count rates are taken into account. For the fitting scenario a set of attenuation coefficients is extracted from the data base and these coefficients are applied to the calibrated detector rates of the background detectors. These attenuated detector rates are subtracted from the calibrated rate of the target detector to derive the net rate corresponding to the gamma intensity from the preferred direction.

The data base of normalized detector rates associated to different radiation background scenarios may be obtained either experimentally or by modelling and Monte Carlo simulation. Realistic background conditions can be obtained with point-like and extended gamma sources of commonly used radio isotopes. By positioning such source at different distances and angles with respect to the detector head a sufficiently detailed set of detector count rate pattern may be generated. Geometrical symmetries of the detector arrangement may be taken into account to reduce the data base size. On the other hand interpolations between data base points might be necessary if for example no source is available to cover a particular gamma energy. Body and organ dummies can be employed to mimic diffuse scattering background. If more complex radiation scenarios have to be considered, superposition of different data base points may be taken into account.

The size and content of the data base depends on the intended application and can be found most easily by experimenting with typical background scenarios. Already most simple data bases can be sufficient to obtain a background reduction superior to prior art gamma probes. For the detection of malignant sentinel lymph nodes activated by $^{18}$F-FDG, using a CsI(T1) detector geometry like the one shown in FIG. 2c, one constant value for all attenuation coefficients adequately covers all occurring background situations.

The count rates observed in the detectors are subject to statistical fluctuations. To obtain a reliable background suppression the statistical fluctuation of the background rate in the target detector needs to be taken into account. This can be done by accepting only target detector rates after background contribution subtraction which are at least above N=2 or N=3 standard deviations N·σ of the background contribution. The probability to find a background value outside N·σ gives the inverse of the background suppression factor. Therefore the wanted background suppression can be adjusted by choosing N. In particular for strongly dominating background intensities this method leads to a reduction of the effective sensitivity to detect a target source. In a preferred embodiment the source detection limit may be 20 cps without background radiation. This limit will increase to about 100 cps in case of a background activity 100 times the target activity and N=3. Note that with conventional gamma probes with collimator the retracted detector position may result in a similar loss in sensitivity irrespective of the actual background activity. It is advantageous to visualize the actual sensitivity limit and the background suppression factor.

With attenuation coefficients applied as discussed above the effective solid angle of direct view of the target detector is minimial. For the example of the preferred embodiment described here the effective solid angle in the far field amounts to about 30° FWHM corresponding to a spatial resolution in the near field of 11 mm for 511 keV gamma rays. If an extended target source or several point-like sources in close neighbourhood are expected it might be desirable to extend the effective solid angle of active view of the target detector. This is achieved by reducing the subtracted background contribution from the background detectors adjacent to the target detector, or equivalently to add part of the count rate of the latter detectors, originating from the wider target region to the target contribution of the central target detector. A simple way is to reduce the values of the corresponding attenuation coefficients. The relation between these reduced coefficients and the size of the effective target solid angle needs to be determined empirically or by modelling and simulation.

The direction of largest gamma intensity can be derived directly from the calibrated detector rates taking into account statistical uncertainties. A simple way to indicate the direction is to activate the one of for example four (up, down, left, right) LEDs which is closest to the derived direction. Another possibility is to interpolate the correct direction by activating one LED only if its direction coincides with the derived direction. Otherwise two LEDs are activated with a light intensity ratio corresponding to the mean interpolated direction between them.

What is claimed is:

1. A method of detecting and localizing gamma radiation from a target source in the possible presence of background gamma radiation, said method comprising the steps of:
   a) detecting the directional intensity distribution of gamma rays with respect to a preferred direction,
   b) analysing the direction dependence, correcting for efficiency and solid angle of the detection means,
   c) determining the amount and spatial distribution of background radiation,
   d) determining the background contribution of the intensity measured in the preferred direction from the amount and spatial distribution of background radiation,
   e) determining the strength of gamma radiation in a preferred direction by subtracting from the intensity measured in the preferred direction any background contribution from non preferred directions; and
   f) providing an indication of the strength of gamma radiation.

2. The method of claim 1, further comprising determining the direction of the maximal gamma intensity from the detected intensity distribution.

3. An apparatus for detecting and localizing gamma radiation from a target source in the possible presence of background gamma radiation, the apparatus comprising:
   a) a multitude of gamma detection means producing electrical pulses in response to gamma interactions,
   b) signal conditioning and processing means for each of said detectors generating gamma count rate information for each detector,
   c) data processing means to compute from the count rate pattern of the detectors information on the gamma intensity in a preferred direction corrected for background radiation from other locations and information on the direction of highest gamma intensity,
   d) interfacing means to indicate the radiation strength in the preferred direction and the direction of highest gamma intensity.

4. The apparatus of claim 3, wherein the gamma detection means is a multitude of gamma detectors made either from scintihlators coupled to photodiodes, or photomultipliers, or solid state diodes.

5. The apparatus of claim 4, wherein the multitude of detectors is arranged in a compact way such that each detector has a field of view at least partially different from each other detector, and each detector acts at least partially as shield for at least one other detector.

6. The apparatus of claim 5, wherein space between and adjacent to detectors is occupied with gamma absorbing means such that the absorbing means acts at least partially as shield for at least one detector, or said absorbing means acts as collimator reducing the field of non-shadowed view of at least one detector.

7. The apparatus of claim 4, wherein space between and adjacent to detectors is occupied with gamma absorbing means such that the absorbing means acts at least partially as shield for at least one detector, or said absorbing means acts as collimator reducing the field of non-shadowed view of at least one detector.

8. The apparatus of claim 4, wherein the multitude of detectors, the signal conditioning and processing means and optical indicators form a hand-held gamma probe connected by electrical or optical means to a display and control unit to display optically and acoustically the intensity of radiation from a preferred direction.

9. The apparatus of claim 8, wherein in the hand-held gamma probe, the optical indicators are placed close to the detectors such that each indicator is associated with a direction and the indicator corresponding to the direction of highest gamma intensity may be activated.

10. The apparatus of claim 3, wherein the multitude of detectors is arranged in a compact way such that each detector has a field of view at least partially different from each other detector, and each detector acts at least partially as shield for at least one other detector.

11. The apparatus of claim 10 wherein space between and adjacent to detectors is occupied with gamma absorbing means such that the absorbing means acts at least partially as shield for at least one detector, or said absorbing means acts as collimator reducing the field of non-shadowed view of at least one detector.

12. The apparatus of claim 10, wherein the multitude of detectors, the signal conditioning and processing means and optical indicators form a hand-held gamma probe connected by electrical or optical means to a display and control unit to display optically and acoustically the intensity of radiation from a preferred direction.

13. The apparatus of claim 12, wherein in the hand-held gamma probe, the optical indicators are placed close to the detectors such that each indicator is associated with a direction and the indicator corresponding to the direction of highest gamma intensity may be activated.

14. The apparatus of claim 3, wherein space between and adjacent to detectors is occupied with gamma absorbing means such that the absorbing means acts at least partially as shield for at least one detector, or said absorbing means acts as collimator reducing the field of non-shadowed view of at least one detector.

15. The apparatus of claim 14, wherein the multitude of detectors, the signal conditioning and processing means and optical indicators form a hand-held gamma probe connected by electrical or optical means to a display and control unit to display optically and acoustically the intensity of radiation from a preferred direction.

16. The apparatus of claim 15, wherein in the hand-held gamma probe, the optical indicators are placed close to the detectors such that each indicator is associated with a direction and the indicator corresponding to the direction of highest gamma intensity may be activated.

17. The apparatus of claim 3, wherein the multitude of detectors, the signal conditioning and processing means and optical indicators form a hand-held gamma probe connected by electrical or optical means to a display and control unit to display optically and acoustically the intensity of radiation from a preferred direction.

18. The apparatus of claim 17, wherein in the hand-held gamma probe, the optical indicators are placed close to the detectors such that each indicator is associated with a direction and the indicator corresponding to the direction of highest gamma intensity may be activated.

19. A method of operating the apparatus of claim 3, the method comprising:
a) calibrating the rate of each detector to account for different detection efficiency and solid angle of direct view of a radiation source for a given gamma energy,
b) normalizing the calibrated detector rates to the rate of the target detector,
c) calculating the statistical uncertainty of the measured count rates of each detector,
d) comparing the normalized detector rates to a data base of predetermined normalized detector rates associated to different radiation background scenarios to associate a scenario, thereby taking into account the statistical uncertainties of the detector count rates,
e) extracting from the data base for the fitting scenario a set of attenuation coefficients and applying these coefficients to the calibrated detector rates of the background detectors, and
f) subtracting the attenuated detector rates from the calibrated rate of the target detector to derive the net rate corresponding to the gamma intensity ftom the preferred direction.

20. The method of claim 19, further comprising determining the direction of highest gamma intensity by comparing the normalized detector rates taking into account the statistical uncertainties.

* * * * *